Sept. 9, 1969 G. W. YOUNG 3,466,501

SELF-ILLUMINATING DEVICES AND SYSTEMS

Filed Sept. 8, 1966 3 Sheets-Sheet 1

INVENTOR.
GORDON W. YOUNG
BY M. Ralph Shaffer
HIS ATTORNEY

INVENTOR.
GORDON W. YOUNG
BY M. Ralph Shaffer
HIS ATTORNEY

SELF-ILLUMINATING DEVICES AND SYSTEMS

Filed Sept. 8, 1966

INVENTOR.
GORDON W. YOUNG
BY M. Ralph Shaffer
HIS ATTORNEY

United States Patent Office 3,466,501

Patented Sept. 9, 1969

3,466,501
SELF-ILLUMINATING DEVICES AND SYSTEMS

Gordon W. Young, 3600 Paradise Road,
Las Vegas, Nev. 89109

Filed Sept. 8, 1966, Ser. No. 577,961
Int. Cl. H05b 37/02
U.S. Cl. 315—169 11 Claims

ABSTRACT OF THE DISCLOSURE

The disclosure of this invention outlines self-illuminating devices and systems for producing changing patterns of light, for decorative purposes. Possible applications include table decorations, illuminated jewelry, and other uses. The disclosure also discusses means for accomplishing the generation of these patterns by using digital counting techniques, motion of the wearer's body (in the case of jewelry), input frequency differences between different elements of a respective system, and other means. A number of different light sources are contemplated in the invention, including gas discharge, electroluminescent, incandescent, and semiconductor devices, all of which are designed to provide a pleasing visual effect.

The present invention relates to self-illuminating systems and devices and, more particularly, to new and improved systems and devices of the type described wherein, by the use of a minimum number of switching or control circuits, a maximum number of light means may be activated to provide a desired random or periodic illumination pattern.

Accordingly, a principal object of the present invention is to provide a lighting device, for decorative or other uses, whereby the individual light means of the lighting device employed may be uniquely activated to provide a desired illumination pattern.

A further object it to provide an integrated lighting device for producing intermittent random lighting patterns.

A further object is to provide decorative lighting systems useable in displays and jewelry, for example, to provide unique illumination patterns of unusual and attractive character.

A further object is to provide in an integrated system certain switching means and light means combinations wherein, with a minimum number of switching means, a maximum number of light means or units can be accommodated so as to provide an attractive, visible lighting pattern.

A further object is to provide illuminating systems for producing a unique lighting display of random light illumination patterns, this with the use of a minimum number of switching or control circuits in combination with a desired number of light means, and this whether the latter be discharge tubes, incandescent lights, electroluminescent units, semi-conductor light sources, and so forth.

The features of the present invention which are believed to be novel are set forth with particularity in the appended claims. The present invention, both as to its organization and manner of operation, together with further objects and advantages thereof, may best be understood by a reference to the following description, taken in connection with the accompanying drawing in which:

FIGURES 9, 10, 11, and 12 are schematic diagrams of optional light means which may be used in the various embodiments of the invention as lighting means.

Figure 13:
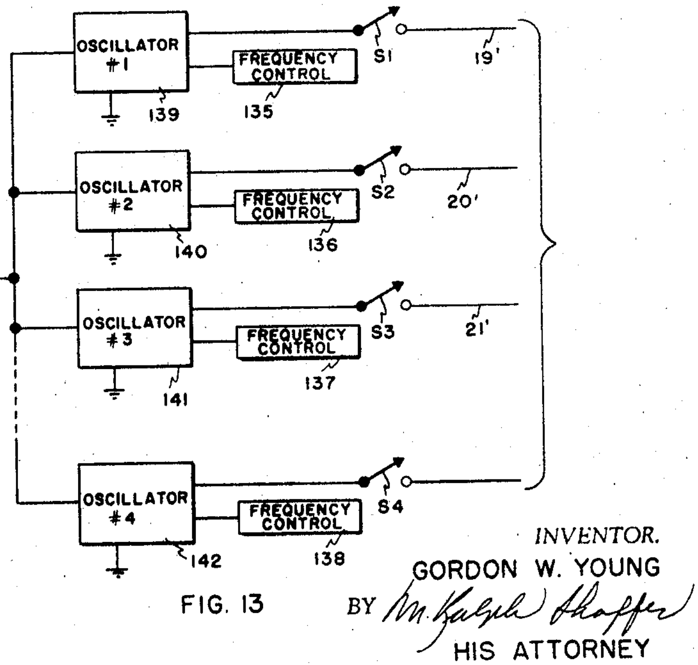

FIGURE 13 is a schematic of yet another embodiment of the present invention.

Figure 14:
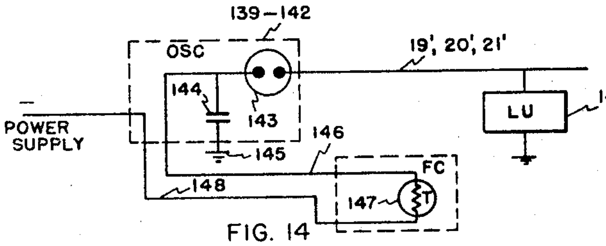

FIGURE 14 is a schematic diagram of a representative oscillator and frequency-control combination which may be used in the circuit of FIGURE 13.

Figures 7, 15, 16, 20:
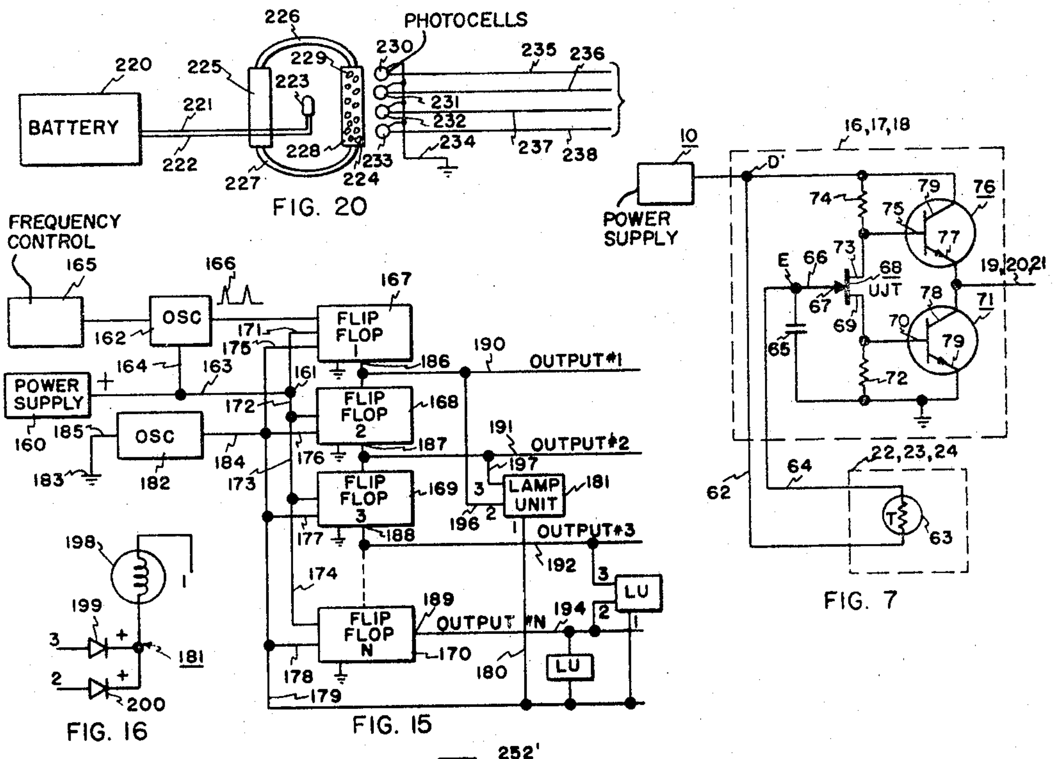
FIGURE 7 is a schematic drawing of an oscillator, frequency control circuit which may be used in the blocks of the circuit of FIGURE 1.

FIGURE 15 is an alternate embodiment of the present invention as to the driving portion of the system.

FIGURE 16 is a schematic diagram of a lamp-type light means which may be employed at one or more points in the driven circuit of the system shown in FIGURE 15.

Figures 17, 18:
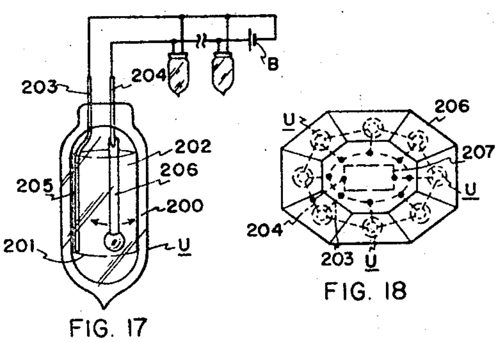

FIGURE 17 is an elevation, partially in schematic form, of a lighting string which may be used as a necklace, for example.

FIGURE 18 is an integrated lighting display wherein a plurality of the devices shown in FIGURE 17 are positioned and connected together to form a unique lighting display.

Figure 19:
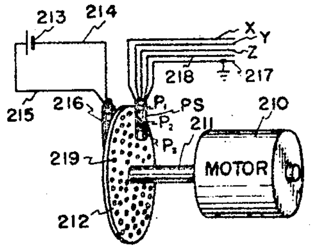

FIGURE 19 is a fragmentary perspective view of motorized means for employing photocell equipment to give random signals in a system incorporating the features of the present invention.

Figure 21:
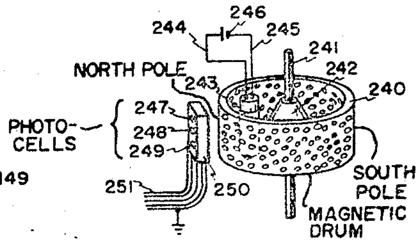

FIGURES 20 and 21 are photoelectric systems for practicing the invention wherein variation in photometry is had through novel evaporator and magnetic means, respectively.

Figure 22:
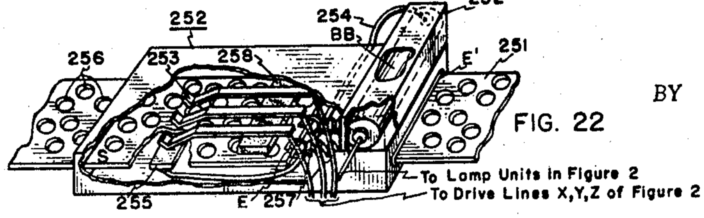

FIGURE 22 is an elevation of physical means which may be employed to vary the signal input to the lighting means.

Figures 3, 4, 5, 6, 23:
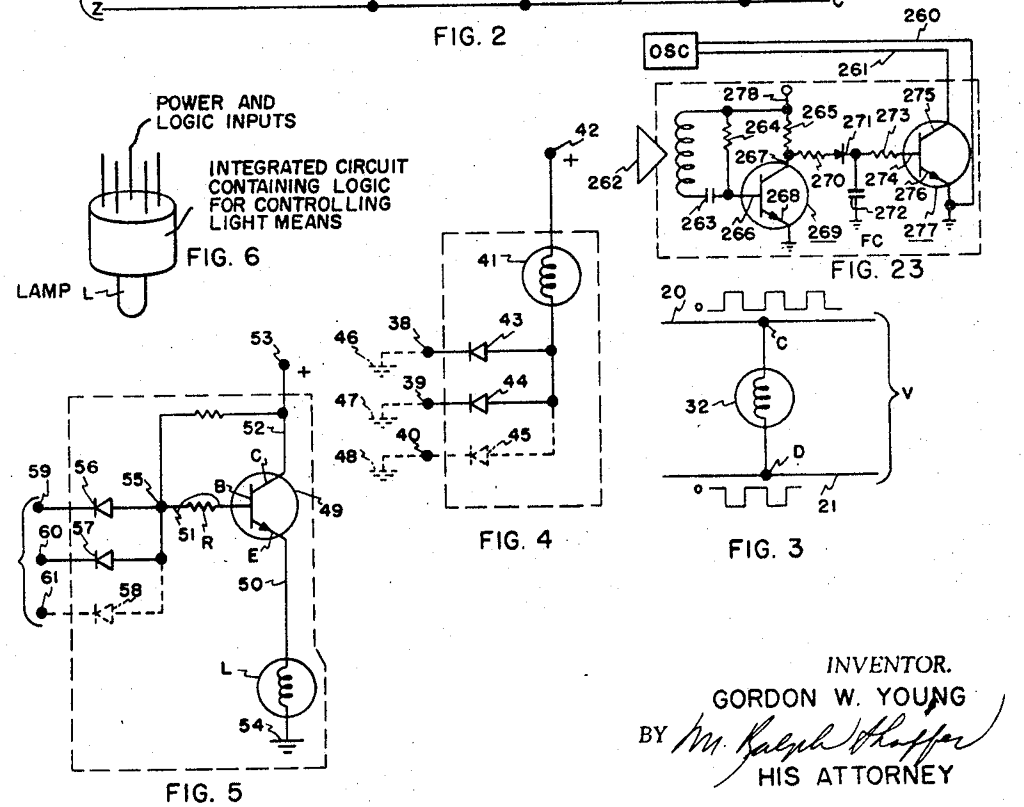
FIGURES 3–5 are schematic drawings of representative light means which may be used in one or more of the boxes of FIGURE 2.
FIGURE 6 is a perspective view of the physical unit, a standard integrated circuit, representing a circuit incorporating the features of the electrical circuits of FIGURES 3, 4, or 5.

FIGURE 23 is an optional frequency control unit.

Figure 1:
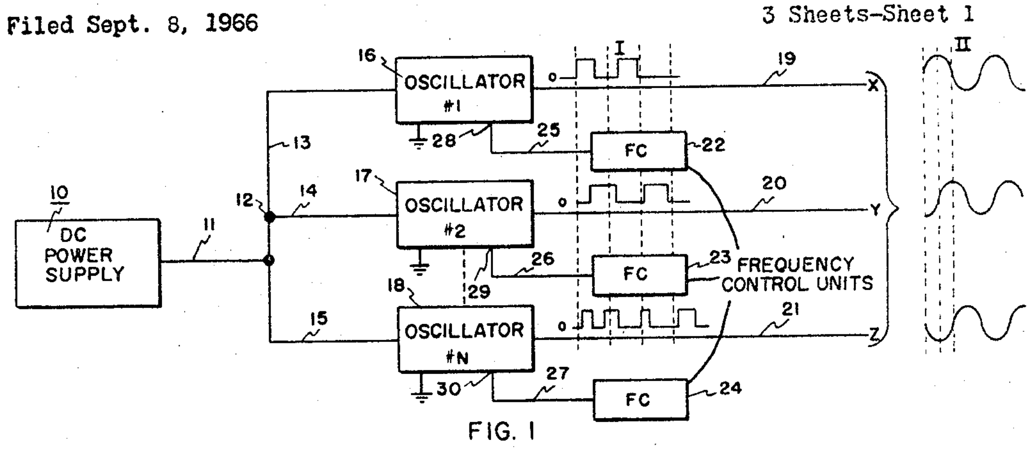
FIGURE 1 is a block diagram of the drive portion of a system incorporating the present invention, wherein a plurality of outputs provide signals, generally of random nature, for driving a multiplicity of light means.

In FIGURE 1 power supply 10 is coupled by lead 11 to junction 12. Junction 12 in turn is coupled by leads 13, 14, and 15 to oscillators 16, 17, and 18 (see FIGURE 7). The power supply 10, while conceivably taking any appropriate form is preferably of the low-voltage type when used in connection with jewelry displays employing respective incandescent lamps or semi-conductors as light means. Where electro-luminescent units and gas discharge units are incorporated as individual light means and are driven, then the power supply will be of a conventional, high-voltage type of standard design, and may conceivably have an output terminal voltage of perhaps one hundred or more volts. As to the term. "oscillator," used in conjunction with units 16, 17, and 18 in FIGURE 1, it will be understood that the word is used in its broadest sense and includes not only periodic oscillators such as sign wave generators, but also aperiodic oscillators, multivibrators, trigger circuits, and so forth. In other words, "oscillator" as used herein merely refers to the fact that a periodic or an aperiodic signal, of whatever wave form, is produced at output leads or drive lines 19, 20, and 21. These are the output drive lines of the three oscillators shown.

It will be understood, of course, that any number of oscillators may be connected in parallel to the power supply 10 and, while oscillators 16, 17, and 18 may be considered as oscillators Nos. 1, 2, and 3, oscillator 18 may also be considered as oscillator N, with additional oscillators being interposed between oscillator 17 and 18 and connected to junction 12.

In its simplest form, the oscillators are connected in parallel to a single power supply, as shown. This is obviously the most advantageous; however, the invention also comprehends the situation where one or more oscillators or one or more groups of oscillators are connected independently to respective power supplies or related sources of electrical power.

Referring again to FIGURE 1 it is seen that units 22, 23, and 24 are connected by respective leads 25, 26, and 27, to control points 28, 29, and 30 of oscillators 16, 17, and 18. Units 22, 23, and 24, coupled thereto, are frequency control units provided to insure a completely random oscillator output or outputs and, of course, may optionally be built into the oscillators themselves to form integral circuit portions thereof. Many oscillators, particularly those of the vacuum type or even the transistor type will tend to drift, frequencywise, during their operation, particularly when there are ambient temperature changes. In such event, or under other circumstances, the frequency controls 22–24 (see FIGURE 7) may be eliminated from the system. However, it may be desirous to use frequency control units 22–24 so as to make the frequency of the oscillator 16–18 responsive in frequency to changes in one or more parameters of the frequency control elements of units 22–24. Devices suitable for employment as frequency control devices are, by way of example, thermistors, magnetic-field responsive elements, or other means responsive to body heat, ambient temperature, the earth's magnetic field, physical conditions of the person's body, transducers, and so forth. It will usually be the case that the designer will wish a completely random operation of the lighting means to be connected to the leads 19, 20, and 21. In other words, the waveforms of the oscillator output signals, whether half-wave, sinusoidal, square wave, pulse, trigger forms, should be random in at least one parameter. It will be frequently desirous for the waveforms on the three leads 19–21 to vary in at least one parameter, not only as among themselves, but actually on each lead as time progresses. This is clearly illustrated in the waveform figures sketched in FIGURE 1. Thus, pulse width and/or pulse spacing may constitute variables, the same being responsive to the conditions—electrical, physical, thermal, or otherwise—of the frequency control unit 22 coupled to oscillator 16, for example. In any event, what generally will not be desirous is a completely periodic, regular output on each of the lines 19–21. That which is required is a random pulse or waveform which will be present at each line 19–21, and where the waveforms on the lines themselves will be randomly associated.

As used in this description and claims, "random" is taken to mean the inclusion of a parameter which varies in such a way that normal elementary probability theory cannot predict future variations in the display pattern. This is because all the "random" patterns are in reality controlled by parameters external to the system outlined such as small ambient temperature fluctuations dependent on time of day, movement of the wearer in the case of jewelry, etc. For this reason, "random" as used in this application fits the definition "lacking a definite plan" as given by Webster's Dictionary.

Wave grouping number I for the three drive lines illustrates that all of the parameters of the wave forms may be variable and totally nonrelated, i.e., "random," to provide output waveforms of completely random character both as concerns the respective individual lines and all lines in toto. Waveform group II illustrates that where regular periodicity is required or desired, the wave forms may be related in phase and identical as desired.

Figure 2:
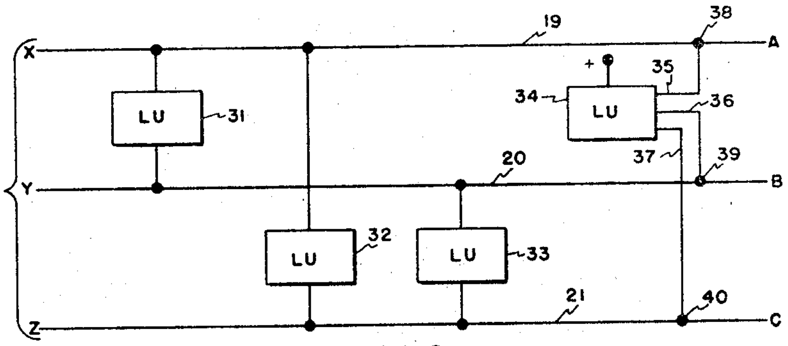
FIGURE 2 is a continuation of the circuit of FIGURE 1 and illustrates in block diagram that portion of the system wherein the light means are contained, to be selectively and generally randomly powered by the circuit of FIGURE 1.

FIGURE 2 discloses a set of lamp units constituting individual light means LU which are driven by the lines 19–21 of FIGURE 1. Points X, Y, and Z in FIGURE 1 correspond to points X, Y, and Z in FIGURE 2. It will be understood that many additional lamp units may be randomly connected between lines 19, 20, and 21 in FIGURE 2 at points A, B, and C, as desired. The term "light means" is to be understood herein to refer not only to incandescent lamps but also gas-discharge lamps and tubes, electroluminescent devices, luminous semiconductors, and so forth. Of course, voltage requirements for the various types of light means will vary as among the devices used; voltage norms for the various types of light means described are well established in the art.

Referring specifically to FIGURE 2, it is seen that the light means 31 is coupled between leads 19 and 20, light means 32 is coupled between leads 19 and 21, light means 33 is coupled between lines 20 and 21, and so forth. Light means 34 is a three-wire unit, being coupled by leads 35, 36, and 37, to the three leads 19–21 as illustrated.

FIGURE 3 illustrates a representative light means such as incandescent lamp 32 can be employed in a circuit at any of the two-wire points given. Thus, the device of FIGURE 3 applies not only to light means 33 but also to light means 31 and 32 as well. It will be seen that the plural light means simply comprise a small incandescent lamp 32 which is selectively activated by the common reference potential pulse trains appearing on leads 20 and 21. When the potential difference imposed across the light means reaches the illumination potential of the light means, then the light means 32 will be activated. When the potential across points C and D, for example, is below the threshold point of illumination for the light means, then the light means will not burn. Variation in lamp illumination is accomplished through variation in arrival at point C and D of compatible pulses which, in their aggregate, will produce an adequate potential difference across the lamp to illuminate the same.

FIGURES 4 and 5 illustrate a three-wire lighting device or light means that can be utilized at 34 in FIGURE 2. The three terminals 38, 39, and 40 correspond and will be connected respectively to the three leads 35–37 in FIGURE 2. The circuit in FIGURE 4 may be an integrated circuit, and in any event may comprise as a light means an incandescent lamp 41 coupled to a voltage source at 42. The opposite side of the plural light means 41 is connected to one side of diodes 43, 44, and 45. Diode 45 is shown in dotted line because it is merely permissibly included. The remaining sides of the diodes 43–45 are connected directly to junction terminals 38–40, respectively, see FIGURES 1 and 2. Ground indications at 46, 47, and 48, merely indicate that a ground or common reference potential relative to voltage source 42 is selectively and preferably randomly applied to the drive oscillators 16–18 as the latter continue in their operation.

It will be understood that light means 41 may likewise simply comprise a semiconductor light means rather than an incandescent lamp.

In FIGURE 5, which likewise preferably takes the form of an integrated circuit unit such as that shown in FIGURE 6, transistor 49 includes emitter, base, and collector leads 50, 51, and 52, respectively. The collector lead is coupled to source 53 the latter of which constitutes a positive source of voltage potential. Emitter 50 is coupled through light source L to ground 54. Base lead 51 is coupled through resistor R to junction 55. Junction 55 in turn is coupled through diodes 56, 57, and permissably included diode 58 to junction points 59, 60, and 61. The circuit of FIGURE 5 might advisably be used as the light means 34 of FIGURE 2.

The operation of the combined circuits of FIGURE 1 and FIGURE 2, in combination with light means comprising the circuits of FIGURES 3–5 will now be described in further detail. As will be observed, it is necessary that all points such as 38, 39, 40, or 59, 60, and 61 be in the energized condition in order to extinguish the plural light means 41 or L. This provides the ability of this system to provide many illumination combinations from a few oscillators. The several light means will illuminate when sufficient voltage is impressed across the terminals of the light means 32. Where the light means 31–33 are of the same general type as that shown in FIGURE 3, then these light means will illuminate at given times, depending upon the condition of oscillators 16–18. This in turn can be either periodic or aperiodic as to operation and may or may not be controlled by frequency controls 22–24, so that a selected pattern can be obtained. In connection with FIGURE 4, when a ground is supplied through any of the oscillators 16–18, then the ground is applied to terminals 38, 39, and 40, in which event diodes 43–45 will conduct, selectively, and light means 41 illuminate. Accordingly, the light means 41 will flash or illuminate at any time that any of the oscillators 16–18 supplies a ground therefore.

A representative way in which the oscillators 16–18 may selectively supply grounds to the circuitry is illustrated in FIGURE 7.

It will be understood that the oscillators above described can take almost any conceivable form. A representative oscillator is shown in FIGURE 7.

FIGURE 7 illustrates a representative oscillator that has been heretofore discussed. Power supply 10 is coupled to the representative oscillator 16, 17, and 18 shown in FIGURE 7 at point D′. Lead 62 is coupled from point D′ through a frequency control unit 22, 23, and 24 which itself may take the form of a thermistor 63. Lead 64 is coupled from unit 22–24 back to junction E of the oscillator. Junction E is coupled through capacitor 65 to ground. Junction E is connected by lead 66 to emitter 67 of unijunction transistor 68. Base 69 is coupled to base 70 of transistor 71 and also through resistor 72 to ground. Base 73 is coupled through resistor 74 to point D′ and also directly to base 75 of transistor 76. Emitter 77 is coupled directly to collector 78 and to the output lead such as 19, 20, and 21. Collector 79 is coupled to the remaining terminal of resistor 74 and back to junction D′.

In operation, a positive voltage is applied to junction D′ and, as a consequence thereof, to one side of thermistor 63 and to the collector 79 of transistor 76 and also to base member 73 of unijunction transistor 68, likewise to the base 75 of transistor 76. The emitter 79 is maintained at ground potential. At the time the power is applied, transistor 76 is in conduction; the output lines 19, 20, and 21 are, therefore, effectively connected to power supply 10, and transistor 71 is turned off. Current flows through the thermistor 63 and begins to charge capacitor 65. As the peak point voltage of the unijunction transistor is reached, the unijunction transistor 68 breaks down, discharging capacitor 65 through resistor 72. At this point, transistor 76 now turns off, and transistor 71 turns on, effectively grounding the output. The end result is that a repetitive oscillation is obtained, the frequency of which depends upon the condition of thermistor 63, so that a ground is selectively applied to the output via transistor 71. It is this ground which is schematically referred to at 46–48 in FIGURE 4, merely by way of example. It will be noted that the FIGURE 7 oscillator is particularly suited for low-voltage work using luminous semiconductors and incandescent lamps.

The previous discussion has been related primarily to low voltage work wherein, as the respective light means, incandescent lamps and luminous semiconductors are used as light sources. The oscillator shown in FIGURE 7 will apply equally as well to high voltage work, howbeit there are other oscillators well known in the art that would be more suitable. More will be said about the type of oscillator that can be used hereinafter.

Figures 8, 8A:
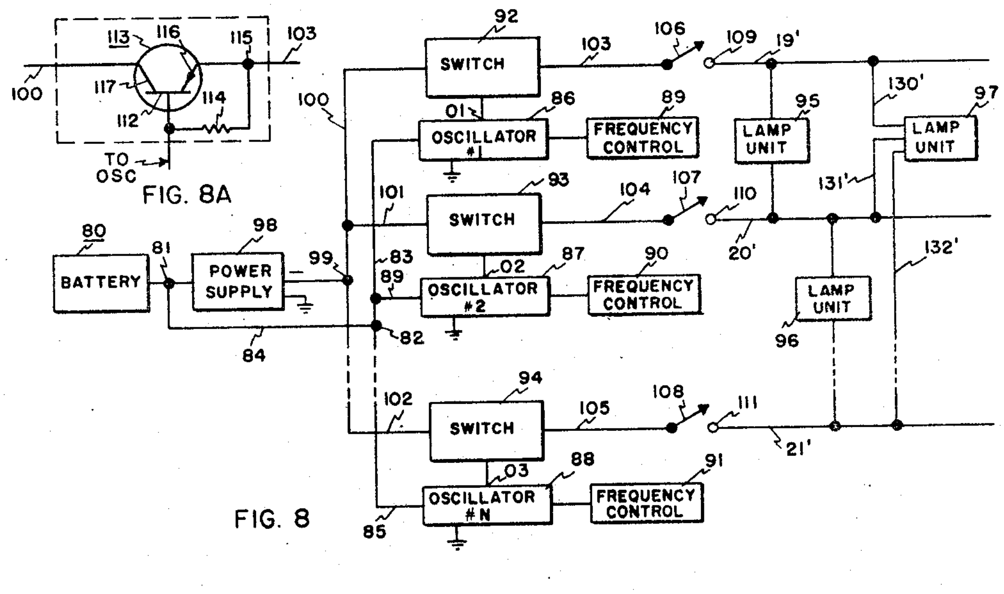
FIGURE 8 is a schematic block diagram of an alternate circuit which may be used in practicing the invention.
FIGURE 8A is an enlarged view of an electronic switch which may be used for a representative switch block in FIGURE 8.
Figure 9:
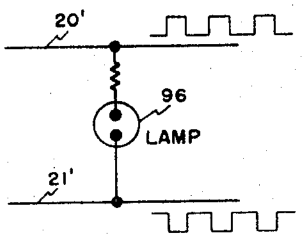
Figure 11:
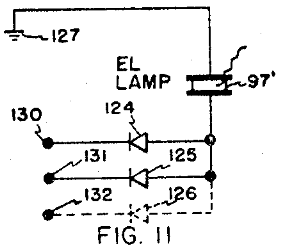
Figure 12:
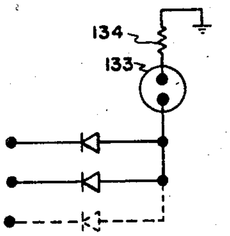

At this point we shall turn our attention to FIGURE 8 which illustrates a representative circuit that can be employed to illuminate the light means used. In FIGURE 8, battery 80 is coupled to junctions 81 and 82 as indicated. Leads 83–85 and 89 couple battery 82 to the oscillators 86, 87, 88, and so on. While three oscillators are shown, it will be understood that any number of oscillators may be employed in the matrix or parallel system. Frequency controls 89, 90, and 91 are coupled to oscillators 86–88 and perform the same function and may take the same form that is shown in FIGURES 1–7. It will be noted that the output of the oscillators at points O1, O2, and O3, control electronic or electromechanical switches 92, 93, and 94 which in turn control the illumination of light means 95, 96, 97, and so on. Returning to the power source, power supply 98 is coupled to junction 81 and junction 99. Junction 99 is connected to switches 92–94 through leads 100, 101, and 102. The output leads 103, 104, and 105 of switches 92–94 are connected to on-off mechanical switches 106, 107, and 108 as indicated. Poles 109–111 of the switches mentioned are coupled to leads 19′, 20′, and 21′ which correspond to leads 19–21 in FIGURE 1. The light means 95 and 96 and 97 correspond to the lamp units of FIGURES 1–6 or, where a high-voltage system is used, the light means will generally take the form of a gas discharge tube as shown in FIGURE 9 or an electroluminescent device as shown in FIGURES 11 or 12.

The circuit of FIGURE 8 operates as follows. The battery supplies power to the oscillators in a manner as heretofore described in connection with FIGURE 1, the battery also supplies power to supply 98, a high-voltage power supply which provides power to switches 92, 93, and 94.

FIGURE 8A shows a representative switch which may be used as the switch 92, 93, 94 or FIGURE 8. The switch may simply take the form of a combination transistor and resistor wherein the base 112 of transistor 113 is connected directly to the oscillator to which it is related, see FIGURE 8, and also through resistor 114 to junction 115. The emitter 116 of transistor 113 is directly connected to lead 103 as indicated. The collector 117 is directly connected to lead 100 of FIGURE 8 as shown.

In operation it will be noted that a negative potential is applied at lead 100 to collector 117 of transistor 113. When the output of the oscillator is applied to base 112, transistor 113 turns on, thereby raising the potential at point 115 from ground to approximately the same potential as point 100. The operation of the remainder of the circuit in FIGURE 8 is identical to that described with reference to FIGURES 1–6. It will be noted that the circuit of FIGURE 8 also includes, however, switches 106, 107, and 108. These may be provided so as to selectively control the light means used. This is to say, some of the light means may be of one color relative to lead 103, whereas certain of the several light means relating to lead 104 may be of another color, and so forth. Thus, the opening and closing of the switches will select different light means for periodic or aperiodic actuation. This is particularly effective when standard different-colored lights or light groupings are employed with the respective output leads.

Thus, the light means used may be, of course, gaseous discharge tubes, either neon or xenon, for example. The gaseous discharge tube will light once a potential is applied across its terminals which exceeds the breakdown voltage of the tubes.

Figure 10:
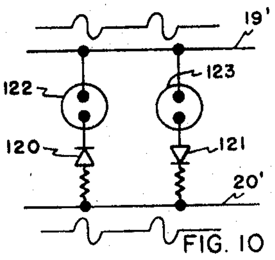

FIGURE 10 illustrates another type of light means wherein gaseous discharge tubes are disposed in series with respective diodes 120 and 121. The gaseous discharge tubes are labeled as 122 and 123 and may, for example, be disposed between leads 19' and 21'. In the case of FIGURE 10 the gaseous discharge tubes will be responsive in their activation to the polarity of the potential applied across the same. When using such a light means as that seen in FIGURE 10, the oscillators concerned will mutually intercooperate so that the polarities across the gaseous discharge tube, diode combinations will reverse. A suitable oscillator which may be used for the oscillators 86–88 in this regard would have an aperiodic differential output wherein the output changes aperiodically in polarity. These are well known in the art. Another type of lamp unit that can be used is that shown at 97 in FIGURE 8 and at 97' in FIGURE 11. The light means taking the form of electroluminescent unit 97' is connected to diodes 124 and 125 and permissably included diode 126. These correspond to the three lead outputs of light means 97. The remaining side of the electroluminescent unit 97' is simply maintained at ground potential 127. The power supply at 98 is maintained at ground potential the latter of which corresponds to the ground 127 in FIGURE 11. Thus, when negative pulses appear at terminals 130, 131, and 132, which correspond to leads 130', 131', and 132', current proceeds through electroluminescent device 97' so as to cause same to illuminate. The electroluminescent members can be disposed in suitable matrices to light up in random or periodic fashion.

FIGURE 12 is an optional type of light means which may be used in the structure of FIGURE 8, but wherein the electroluminescent unit is this time replaced by a gas discharge device such as neon tube 133. The gas discharge tube approach is, of course, optional. The diodes shown in dotted line FIGURES 11 and 12 are permissibly included in a three wire unit.

FIGURE 13 is a block diagram of another circuit which can be used in practicing the present invention and which is substantially identical to that shown in FIGURE 8, operating in the same manner, excepting that the switch means are removed. In other words, the output of the oscillator is coupled directly through switches S1, S2, S3, and S4 to the leads 19', 20', 21', and so forth, leading to the several light means as seen in FIGURE 8. In the embodiment shown in FIGURE 13, the oscillators themselves may be either fixed or variable, and may permissably be controlled by the frequency controls 135, 136, 137, and 138 as indicated.

The oscillators 139–142 may be a very simplified form as shown in FIGURE 14. The oscillators are seen to include as a light means a gaseous discharge tube such as a neon tube 143 which is coupled by capacitor 144 to ground 145. The discharge tube is also connected by discharge lead 146 through thermistor 147 (frequency control) to lead 148 which connects to the power supply as indicated. Representative output leads 19'–21' are indicated. In operation, capacitor 144 charges so as to impress a potential across the gaseous discharge tubes 143, etc., which are connected through the appropriate lamp unit to ground as indicated. Specifically, the capacitor 144 charges through thermistor 147 until it reaches the ionization potential of the gaseous discharge tube 143, etc. When the voltage applied to gas discharge lamp 143 reaches the breakdown voltage of that lamp and also of lamp 133 in FIGURE 12, both lamps will break down. The voltage available when lamp 143 fires is also applied to lines 19' and to all light means connected to lines 19' firing all those light means as well as light means 149. When the several light means 143 and 149 discharge, break down, or conduct, then the capacitor 144 rapidly discharges. It is to be noted that the thermistor 147 is in the direct charge path of capacitor 144 so that its condition will control the charging of the capacitor 144 to the breakdown potential of the gas discharge tubes (in series) and hence controls the frequency of the oscillator 149–142.

FIGURE 13 disclosed the entire circuit, excluding lamp sources, wherein the oscillator of FIGURE 14 is used at the oscillator positions shown in FIGURE 13. The individual switches S1–S4 are utilized so that different sets of light means may be used for illumination purposes. The combination of battery 151 and power supply 152 is for the purpose of supplying a relatively high potential (in excess of 100 volts, for example), to the oscillators shown.

In FIGURE 15, power supply 160 is coupled to junction 161 and also to oscillator 162 by leads 163 and 164. Oscillator 162 is provided with a frequency control 165 in a manner hereinbefore described, and produces an output wave 166 which constitutes the input for a bistable multivibrator or, as termed in the art, flip-flop 167. Four flip-flops 167–170 are provided and their power input leads are connected together as illustrated by leads 171–174. The output inhibit terminals of the respective flip-flops 167–170 are connected by leads 175–178 to common line 179 leading via lead 180 to lamp unit 181 and on the other side of the circuit, to oscillator 182 and ground 183 via leads 184 and 185. Output terminals 186–189 lead to drive lines 190–192, 194 corresponding to previously mentioned drive lines 19', 20', and so on. Light means 181 is connected via leads 180, 196, and 197 to drive lines 190, 191, and the common line in the manner indicated. FIGURE 16 illustrates a representative light means 181 including incandescent lamp 198 which is coupled to parallel-connected diodes 199 and 200. It will be seen that the lamp 198 will light whenever a pulse of appropriate polarity appears at diode 199 or diode 200.

In operation the oscillator 162, either having a random frequency and/or being subject to drift, or having a random frequency control if desired, is powered by a power supply 160 and produces a wave of any desired shape at 166 for the flip-flop chain. The flip-flops are each bistable multivibrators operating in a binary manner so that the composite flip-flop circuit in effect performs somewhat like a counter circuit. Thus, at output #2, for every pulse appearing here there will have occurred two pulses at output #1 (at lead 190). The oscillator unit 182 may be either electronic or manual but almost certainly an electronic oscillator of some suitable type (the subject of FIGURE 7 may be employed). Where a mechanical switch or transducer is employed, the same would be activated by some type of body movement of some sort. This oscillator 182, upon being activated, effectively inhibits the flip-flop inputs, thus stopping the "counting," and at the same time, applies the flip-flop outputs to drive lines 190–194 effectively displaying a pattern derived from the various current "on" or "off" states of the flip-flop outputs. It will be seen that even though the flip-flop circuitry is relatively simple, yet an extremely random pattern of light illumination from the lamp units connected to the outputs of the several multivibrators or flip-flops may be effected.

FIGURE 17 illustrates a string of light means connected together in parallel which ideally could serve as a string of women's beads. Glass envelope 200, either forming a "bead" or being fixedly disposed in a translucent bead shell, is interiorly coated with a conductive coating such as a tin oxide coating 201, for example, and includes in the interior a gas such as xenon at 202. The envelope is sealed and includes electrodes 203 and 204 as indicated. Electrode 203 is electrically connected to the tin oxide coating at 205 for example. An interior electrode 206 is connected to electrode 204 and is preferably made of a two-way deformable material such as simply a spring. This is to say, the electrode 206 should be sufficiently rigid so as to maintain its general longitudinal orientation under normal conditions but, however, when the envelope is disturbed, it should be able to bend or otherwise alter its disposition so as to approach the tin oxide coating on the interior of the envelope. When the proximity distance between electrode 206 and the envelope, and the tin oxide coating 201 has decreased a substantial amount, then the gas within the envelope will ionize so as to produce a unique glow. A plurality of the lights can be connected in parallel or series and constitutes a string of beads or a string of other types of ornaments, for any moving object.

FIGURE 18 is an integral device including, for example, a transparent plastic case 206 which houses, as plural individual light means, a plurality of encased units U as shown in FIGURE 17. The battery for the device may be disposed at 207 and corresponds to battery B in FIGURE 17. The electrodes 203 and 204 may be interconnected together with the other electrodes of the units U; the leads stemming from each of the units proceed centrally to the supplied battery at 207.

FIGURE 19 illustrates an electromechanical way of providing random pulses for drive lines leading to the lamp sources. In FIGURE 19, a motor 210 includes an output shaft 211 having keyed thereto a perforated disc 212. A battery source 213 is connected by leads 214 and 215 to a light source 216. There will be a plurality of photocells disposed in photocell unit PS in FIGURE 19, such unit being supplied with a plurality of output leads XYZ as indicated, together with a common lead at 217. The perforations 219 in disc 212 serve to provide entry for the light emanating from source 216 to the plurality of photocells P1, P2, and P3 which are connected to the XYZ leads, and so forth. Accordingly, there results a pattern of electrical connections between the common lead and lines X, Y, and Z in FIGURE 19 in random fashion, this, in accordance with the rotation of perforated disc 212 between the light source 216 and the photocell plurality PS. Lines X, Y, and Z may be identical with lines X, Y, and Z of FIGURE 2.

In FIGURE 20, battery 220 is connected by appropriate leads 221 and 222 to the light source 223. Light source 223 is disposed proximate to a transparent or translucent evaporator chamber 224. The latter is connected to condenser 225 via conduit 226 and 227. Disposed within evaporator 224 is a liquid carrier such as ether at 228, and suspended in the ether (and having the approximate specific gravity of the ether) are a series of opaque plastic particles 229. Disposed on the other side of the evaporation chamber are a series of photocells 230, 231, 232, and 233. These photocells, in turn, are connected to a common line 234 as illustrated and also to drive lines 235, 236, 237, and 238, to connect to the various lamp units to be used as shown in FIGURE 2 for example. In operation, when the evaporator is positioned proximate a portion of the wearer's body such as the neck, the ether, in having a low boiling point, will tend to evaporate, causing an upflow through the plastic granules in the evaporator. The ether will proceed to the condenser 225 to be condensed since the latter will be disposed out of proximity with the body of the wearer. It is this circulation which causes a movement of the black particles within the evaporator and hence a random interference with the light means emanating from the light source 223 toward the photocells 230–233. In this way the photocells will receive varying light patterns; hence varying signals will be supplied. The light units will be connected to the drive lines 235–239.

It will be noted that the FIGURE 20 as a structure will be very suitable for high voltage systems. Where low voltage incandescent lamps are used, then, of course, the photocell outputs will have to be employed to trigger high current circuits feeding into the lamp units.

Another type of sensing device that can be utilized, is that which relies upon the compass principle. In FIGURE 21 a perforated drum 240 is mounted upon shaft 241 which is journalled by appropriate means 242. A light source 243 is supplied within the drum and includes leads 244 and 245 leading to battery source 246. A plurality of photocells 247, 248, and 249, for example, are housed in photocell unit 250, and plural photocell leads 251 are connected to the photocells in the usual manner and lead to the load or light circuits such as that shown in FIGURE 2.

It will be observed that the drum will be north seeking so that as the wearer changes his physical orientation, a variation in the perforation pattern of the photocell light source 243 and the photocells 247–249 will be effected. There will correspondingly appear a variation in the light patterns received by the photocells and hence a variation in current supply to the load or lamp units of FIGURE 2. It will be understood that the lead to the photocell will connect directly to the lamp units and that a common lead will be supplied in the usual manner.

Another technique which may be employed, and which supplants the oscillator portion of the system, is that of a perforated belt 251, see FIGURE 22, which simply can be worn around the waist or midriff of the wearer. As to the belt 251, and E' is fixed to case 252' of control unit 252, while end E passes through slot S of case 252' and connects to the case 252' via springs 257. Control unit 252 may simply have a plurality of fingers 253 (or their equivalent). These fingers will be connected to drive lines at X, Y, Z of FIGURE 2 (using the FIGURE 4 light means, for example), and will selectively engage contact plate 255 through perforations 256. It will be noted that the perforations underneath the spring fingers 253, mounted on support 258, can be varied by inhalation and exhalation or other bodily movements of the user, as the user's muscles expand and contract, extending springs 257. A battery BB may be mounted to the case 252' and connect to the positive terminal of the lamp unit (see + at FIGURE 2) and to lead 254.

In FIGURE 23 a sound responsive frequency control unit is seen, and may be used, for example, at 22–24 in FIGURE 1. In construction, a microphone 262 has one lead connected to power supply 278, and its other lead connected through capacitor 263 to base lead 266 of transistor 269. Resistor 264 is connected between base 266 and power supply 278. The emitter lead 268 of transistor 269 is connected to ground, and the collector lead 267 is connected to point 278 through resistor 265. Resistor 270 is connected to lead 267 and also to one lead of diode 271. Diode 271 has its other lead connected to resistor 273, and capacitor 272. Capacitor 272 has its other lead connected to ground. Resistor 273 is also connected to base lead 274 of transistor 277, collector lead 275 is connected to line 261, and emitter lead 276 is connected both to ground and to output lead 260.

In operation, sound waves picked up by microphone 262 are amplified by transistor 269, rectified by diode 271, and integrated by capacitor 272. As the average level of voltage across capacitor 272 rises because of sound input to the microphone 262, or falls by discharging through the base lead 274 of transistor 277, the effective resistance of transistor 277 varies as measured between leads 260 and 261, thereby enabling said transistor to take the place of thermistor 147 in FIGURE 14. This provides frequency control of the oscillator circuit in FIGURE 14 in an analogous manner to that of the thermistor.

It is thus seen that there are many types of approaches suggested by this invention which are available for producing preferably a random activation of light means of whatever type. Again, the light means uses incandescent bulbs, luminous semiconductor elements, gas discharge tube devices, electroluminescent devices or segments, or other means which are electrically responsive to produce illumination of a desired character. The switching means can take either an electronic, electromechanical, transducer, magnetic, or other physical form to effect a preferably random supplying of electrical energy to desired light means so as to illuminate the latter in a random fashion. This is preferably done such that the luminescence achieved is subtle and pleasing to the senses as the user either changes her position, her physical contour as she breathes, or as an electrical controlling means, sound, or other sensed condition alters its character, for example.

Thus, what has been introduced to the invention is a device and systems wherein periodic or aperiodic and random actuation of light sources can be produced to achieve a visual effect, whether in jewelry, table displays, or other luminous display system or devices.

While particular embodiments of the present invention have been shown and described, it will be obvious to those skilled in the art that changes and modifications may be made without departing from this invention in its broader aspects.

I claim:

1. A decorative illuminating system including, in combination, a plurality of independent drive lines, a plurality of individual light means respectively connected between respective, different pairs of said drive lines, and plural means for applying respective signals, all related to a common reference potential, to respective ones of said drive lines, for causing said light means to vary in observable luminescence in desired fashion.

2. The combination of claim 1 wherein said plural applying means comprise respective oscillators coupled to respective ones of said drive lines.

3. The combination of claim 2 wherein at least one of said oscillators is provided with frequency control means for insuring the random nature of at least one parameter of the output signal of said one oscillator.

4. The combination of claim 2 wherein said system includes plural switch means individually interposed between said respective oscillators and respective ones of said drive lines.

5. The combination of claim 1 wherein at least one of said light means includes means responsive to electrical energy for emitting illumination, and plural diode means interconnected between said responsive means and respective ones of said drive lines, to insure said responsive means is illuminated only when said drive lines coupled to said diodes provide at least one illumination input.

6. A jewelry item including, in combination, a plurality of electrically connected, independent light means, means for supplying electrical power to said light means, and plural, independent means intercoupled between said power supplying means and said light means, respectively, for randomly gating power to said light means.

7. The combination of claim 6 wherein at least one operating parameter of one of said gating means which controls the character of said random gating is responsive to physical orientation.

8. The combination of claim 6 wherein at least one operating parameter of one of said gating means which controls the character of said random gating is responsive to ambient temperature changes.

9. The combination of claim 6 wherein at least one operating parameter of one of said gating means which controls the character of said random gating is responsive to movement of proximate physical objects.

10. The combination of claim 6 wherein at least one operating parameter of one of said gating means which controls the character of said random gating is responsive to an ambient sound level.

11. A self-luminous decorative display including, in combination, plural, electrically activated, luminous means, an electrical power supply, and electrical circuit means intercoupled between said power supply and said plural luminous means for supplying power thereto to activate individual ones of said luminous means, independently of any change in physical position of said display, for intermittent illumination of said plural luminous means.

References Cited

UNITED STATES PATENTS

| | | | |
|---|---|---|---|
| 3,130,348 | 4/1964 | Lieb | 315—149 |
| 3,246,202 | 4/1966 | Rhodes | 315—170 |
| 3,249,804 | 5/1966 | Aiken | 315—169 |
| 3,343,128 | 9/1967 | Rogers | 340—166 |
| 3,351,928 | 11/1967 | Smola | 340—324 |
| 3,258,628 | 6/1966 | Adon | 313—108 |
| 3,226,601 | 12/1965 | Cramer et al. | 315—210 |

JOHN W. HUCKERT, Primary Examiner

SIMON BRODER, Assistant Examiner

U.S. Cl. X.R.

63—32; 315—161